United States Patent
Di Domenico et al.

(10) Patent No.: US 11,307,081 B2
(45) Date of Patent: Apr. 19, 2022

(54) METHOD AND DEVICE FOR DETERMINING AN ESTIMATE OF THE TOTAL MASS OF A MOTOR VEHICLE

(71) Applicant: COMPAGNIE GENERALE DES ETABLISSEMENTS MICHELIN, Clermont-Ferrand (FR)

(72) Inventors: Domenico Di Domenico, Lyons (FR); Alexandre Chasse, Paris (FR); Guillaume Sabiron, Lyons (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 615 days.

(21) Appl. No.: 16/314,074

(22) PCT Filed: Jun. 21, 2017

(86) PCT No.: PCT/EP2017/065176
§ 371 (c)(1),
(2) Date: Dec. 28, 2018

(87) PCT Pub. No.: WO2018/001808
PCT Pub. Date: Jan. 4, 2018

(65) Prior Publication Data
US 2019/0226905 A1    Jul. 25, 2019

(30) Foreign Application Priority Data
Jun. 30, 2016 (FR) ...................... 1656189

(51) Int. Cl.
*G01G 19/03* (2006.01)
*G01G 19/08* (2006.01)
(Continued)

(52) U.S. Cl.
CPC .......... *G01G 19/086* (2013.01); *G06F 30/20* (2020.01); *G06F 2111/10* (2020.01); *H03H 17/0202* (2013.01); *H03H 2017/0205* (2013.01)

(58) Field of Classification Search
CPC ... G01G 19/086; G06F 30/20; G06F 2111/10; H03H 17/0202; H03H 2017/0205
See application file for complete search history.

(56) References Cited

U.S. PATENT DOCUMENTS 7,536,272 B2    5/2009  Leminoux et al.
8,457,891 B1 *  6/2013  Vallot .................... G05D 1/101
                                                                    701/501
(Continued)

FOREIGN PATENT DOCUMENTS

EP    2505448 A1    10/2012
FR    2857090 A1    1/2005
(Continued)

OTHER PUBLICATIONS

International Search Report dated Jul. 17, 2017, in corresponding PCT/EP2017/065176 (4 pages).

*Primary Examiner* — Mohamed Charioui
*Assistant Examiner* — Christine Y Liao
(74) *Attorney, Agent, or Firm* — Venable LLP

(57) ABSTRACT

A method determines the total mass of an automotive vehicle on the basis of data of a communication network and parameters of the vehicle, in which an estimation of the total laden mass (mv,est) of the vehicle, of the speed of the vehicle (vest) and of the slope of the road ($\alpha$est) is determined at an instant (k) by applying the fundamental equation of dynamics and as a function of the values of the total mass of the vehicle, of the speed of the vehicle and of the slope of the road at a previous instant (k−1).

9 Claims, 2 Drawing Sheets

(51) Int. Cl.
*G06F 30/20* (2020.01)
*G06F 111/10* (2020.01)
*H03H 17/02* (2006.01)

(56) References Cited

U.S. PATENT DOCUMENTS

| | | | | |
|---|---|---|---|---|
| 8,630,767 | B2 * | 1/2014 | Karlsson | G01G 19/086 |
| | | | | 701/33.1 |
| 10,124,806 | B2 | 11/2018 | Raffone | |
| 2007/0038357 | A1 * | 2/2007 | Leminoux | G01G 19/086 |
| | | | | 701/75 |
| 2011/0257927 | A1 * | 10/2011 | Bharadwaj | G01C 25/005 |
| | | | | 702/150 |
| 2013/0054107 | A1 * | 2/2013 | Harvie | G01G 19/086 |
| | | | | 701/99 |
| 2013/0138288 | A1 * | 5/2013 | Nickolaou | B60W 40/13 |
| | | | | 701/23 |
| 2016/0264144 | A1 * | 9/2016 | Fontvieille | B60W 30/18127 |
| 2016/0332633 | A1 * | 11/2016 | Raffone | G01G 19/086 |

FOREIGN PATENT DOCUMENTS

| | | |
|---|---|---|
| FR | 3014191 A1 | 6/2015 |
| WO | 2015/004639 A2 | 1/2015 |

* cited by examiner

METHOD AND DEVICE FOR DETERMINING AN ESTIMATE OF THE TOTAL MASS OF A MOTOR VEHICLE

BACKGROUND

The present invention relates to the field of the estimation of the mass of an automotive vehicle, and especially vehicles of "heavy goods" type equipped with a telematic box.

By telematic box is meant any device making it possible to receive real-time information with regard to the environment and to provide the vehicle's passengers with services tailored to the context. Such telematic boxes are generally provided with a positioning system, especially of global positioning system type termed "Global Positioning System" or "GPS", which uses position data emitted in real time by a constellation of geostationary satellites to accurately determine the position of the vehicle.

More particularly, the invention relates to the estimation at each instant of the mass of a vehicle situated on a path having a non-zero slope or slant.

The knowledge of the total mass of an automotive vehicle is necessary for the proper operation of numerous devices on board the vehicle, especially the devices for managing braking or for managing the automatic gearbox, as well as the devices for managing fuel consumption so as to analyze the tracking of fuel consumption and evaluate fuel consumption reduction margins.

Moreover, for utility vehicles or heavy goods vehicles offering a significant loading capacity, an estimation of the mass of the vehicle allows the user to not exceed a predefined value of authorized so-called gross vehicle weight (GVW). Margins of errors authorized for the determination of the mass are generally used. For example, the authorized error margin may be 5% to 10%. It is nonetheless preferable to obtain lower error margins. Moreover, the mass of vehicles of heavy goods type are subject to significant load variations in relation to the mission thereof. It is therefore desirable to obtain a reliable estimation of the mass of the vehicle in real time, even when the vehicle is engaged on a slope, so as to obtain a detailed energy balance.

Today, the estimation of the mass of an automotive vehicle can be done in various ways, for example by direct measurement of the mass, by estimation with the aid of attitude sensors and on the basis of the stiffness of the spring or of the inflation pressure of suspension cushions in the case of heavy goods vehicles. However, these schemes are expensive and, due to manufacturing variability, do not make it possible to obtain an estimation of the mass which is accurate. Moreover, this type of estimation method does not allow the estimation of the mass of the vehicle when the latter is situated on a slope. Indeed, the vehicle's rear axle assemblies generate loadings on the suspensions as soon as a longitudinal force (that is to say a torque) is applied to the wheels.

Methods also exist for estimating the mass of an automotive vehicle by applying the fundamental principle of dynamics at a single instant.

However, the methods for estimating the mass of an automotive vehicle by applying the fundamental principle of dynamics require a certain rolling time before converging to an accurate estimation of the total mass of the vehicle. Moreover, such methods of estimation are particularly inaccurate and unwieldy to implement since they require an estimation of numerous parameters of the vehicle and are based on assumptions which are not always satisfied.

Reference may be made to document EP 2 505 448-A1 which describes a system for estimating the mass of a vehicle in real time by using the data present on the Controller Area Network communication network of the said vehicle, especially the acceleration and the motor torque at each instant. However, this document does not describe the method making it possible to compute the estimation of the mass of the vehicle.

The object of the present invention is therefore to remedy these drawbacks.

SUMMARY

The subject of the invention is a method for determining the total mass of an automotive vehicle on the basis of data of a "CAN" communication network, and of parameters of the vehicle, in which:
data are retrieved from a database of parameters of the vehicle, which parameters are hosted in a computer of the automotive vehicle.

The method of determination comprises the following steps:
setting parameters are retrieved, included in the group comprising the execution time of the method for estimating the mass, the covariance matrix of the measurement noise, the covariance matrix of the modelling indeterminacies with regard to the speed and the slope and the covariance matrix of the modelling indeterminacies with regard to the mass,
data are retrieved, originating from the "CAN" communication network, included in the group comprising the speed of the vehicle, the downshift ratio of the transmission, the level of depression of the brake pedal, the level of use of the retarder and an estimation of the torque provided by the heat engine and of these mechanical frictions,
the motive force generated by the vehicle is determined as a function of the motor torque value, of the downshift coefficient of the transmission, of the efficiency coefficient of the transmission and of the radius of the wheel,
the aerodynamic friction force is determined as a function of the data retrieved from the database of parameters,
the rolling resistance force is determined, at an instant, as a function of the mass of the vehicle, of the coefficient of rolling resistance of the tires, and of the slope of the road,
the force induced by gravity is determined, at an instant, as a function of the vehicle mass estimated at a previous instant, of the gravity constant and of the slope of the road estimated at a previous instant, and
an estimation of the total laden mass of the vehicle, of the speed of the vehicle and of the slope of the road is determined at an instant by applying the fundamental equation of dynamics and as a function of the values of the total mass of the vehicle, of the speed of the vehicle and of the slope of the road at a previous instant.

In one embodiment, to determine an estimation of the total laden mass of the vehicle, of the speed of the vehicle and of the slope of the road, two filters are applied in parallel.

For example, a first so-called "Kalman" filter allowing the filtering of the speed of the vehicle and of the slope of the road and a second so-called "Kalman" filter making it possible to estimate the mass of the vehicle are applied, the two filters being applied in parallel.

At the same time as the step of determining an estimation of the total laden mass of the vehicle, of the speed of the vehicle and of the slope of the road, it is possible to determine an estimation of two covariance matrices: a covariance matrix of dimension two by two (2×2), expressing the covariance of the error in the speed variable and slope variable, and a covariance matrix of dimension one by one (1×1), expressing the covariance of the error in the mass variable as a function of the covariance matrix of the modelling indeterminacies with regard to the speed and the slope and of the covariance matrix of the modelling indeterminacies with regard to the mass.

The covariance matrices can be determined on the basis of the fundamental equations of dynamics, of the values of the total mass of the vehicle, of the speed of the vehicle and of the slope of the road at a previous instant and of a Riccati equation whose sought-after variable is the covariance matrix of the estimation errors.

Prior to the step of retrieving the data originating from the communication network, it is possible to reinitialize, at the initial instant the mass of the vehicle, the speed of the vehicle, the slope of the road, and the two covariance matrices.

For example, prior to the step of determining an estimation of the total laden mass of the vehicle, of the speed of the vehicle and of the slope of the road, it is verified, at the instant, that all the conditions are fulfilled for undertaking the computation of the estimation of the mass.

In one embodiment, the conditions to be satisfied are: that the speed of the vehicle is strictly positive and that the position of the brake pedal and the level of use of the retarder are zero.

In one embodiment, a value of the estimation error is computed by comparing the value of the estimation of the speed determined with the value of the speed measured by the communication network.

In one embodiment, a proportionality coefficient is computed as a function of the covariance matrices and of the equations of dynamics.

In one embodiment, the estimations of the speed of the vehicle of the slope of the road and of the mass of the vehicle which are determined are corrected as a function of the value of the estimation error and of the proportionality coefficient.

For example, after having determined the estimations of the speed of the vehicle of the slope of the road and of the mass of the vehicle, it may be verified that the journey of the vehicle has terminated, and when the journey of the vehicle has terminated, it is possible to compute an average value of the mass of the vehicle at the end of the journey as a function of the estimations of the mass of the vehicle and it is possible to transmit the said average value of the computed mass to a server.

In one embodiment, the position of the vehicle is determined in real time in the form of latitude, longitude and altitude as a function of the satellite data received by a "GPS" global positioning system of the automotive vehicle, and the speed of the vehicle is determined in real time as a function of the data received by the global positioning system.

According to a second aspect, the invention relates to a device for determining the total mass of an automotive vehicle on the basis of data of a communication network comprising a module for processing the data which is able to receive, as input, data of parameters of the vehicle, which parameters are hosted in a computer of the automotive vehicle, included in the group comprising the equivalent mass of the rolling elements, the coefficient of rolling resistance of the tires, the density of the air of the vehicle, the frontal surface area of the vehicle, the drag coefficient and the radius of the wheels of the vehicle.

The module for processing the data receives, as input, setting parameters originating, for example, from a settings database included in the group comprising the execution time of the method for estimating the mass, the covariance matrix of the measurement noise, the covariance matrix of the modelling indeterminacies with regard to the speed and the slope and the covariance matrix of the modelling indeterminacies with regard to the mass, and data originating from a communication network, such as the speed of the vehicle, the downshift ratio of the transmission, the level of depression of the brake pedal, the level of use of the retarder and an estimation of the torque provided by the heat engine and of these mechanical frictions.

The determination device comprises a module for computing an estimation of the total laden mass of the vehicle, of the speed of the vehicle and of the slope of the road at an instant by applying the fundamental equation of dynamics and as a function of the values of the total mass of the vehicle, of the speed of the vehicle and of the slope of the road at a previous instant.

Advantageously, the computation module comprises two filters disposed in parallel and a module for estimating two covariance matrices respectively of dimension 2×2 and 1×1 and expressing respectively the covariance of the error in the speed variable and slope variable and the covariance of the error in the mass variable as a function of the covariance matrix of the modelling indeterminacies with regard to the speed and the slope and of the covariance matrix of the modelling indeterminacies with regard to the mass.

The computation module comprises, for example, a first module for estimating the total laden mass of the vehicle, the speed of the vehicle and the slope of the road as a function of the values of the mass of the vehicle, of the speed of the vehicle and of the slope of the road at a previous instant, the said first module comprising a first so-called "Kalman" filter allowing the filtering of the speed of the vehicle and of the slope of the road and a second so-called "Kalman" filter making it possible to estimate the mass of the vehicle, the two filters being disposed in parallel.

In one embodiment, the computation module comprises a module for correcting the estimation values determined comprising a module for computing an estimation error comparing the value of the estimation of the speed determined with the value of the speed measured by the network and a module for computing a proportionality coefficient as a function of the covariance matrices and of the equations of dynamics.

In one embodiment, the determination device comprises an end-of-journey detection module, a module for computing an average value of the mass of the vehicle at the end of the journey and a communication module able to transmit the said average value of the mass of the vehicle to a server.

BRIEF DESCRIPTION OF THE FIGURES

Other aims, characteristics and advantages of the invention will become apparent on reading the following description, given solely by way of nonlimiting example and with reference to the appended drawings in which.

DETAILED DESCRIPTION

Figure 1:
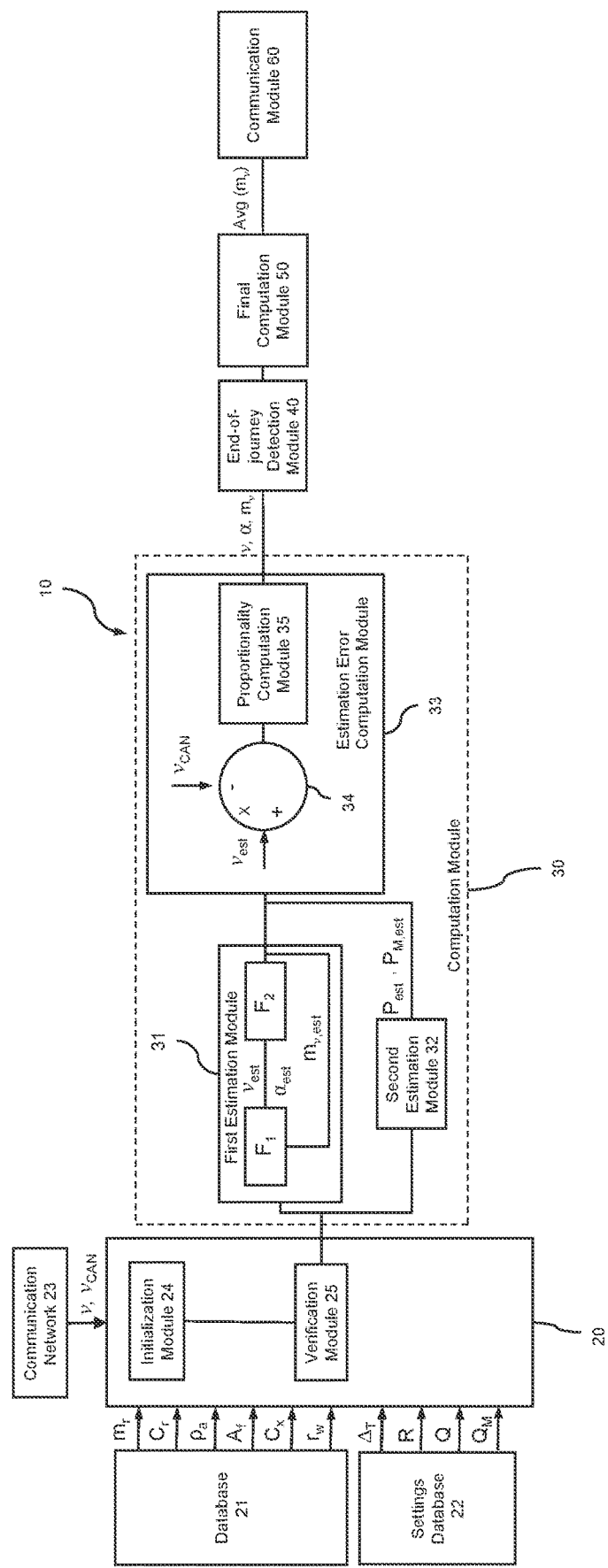
FIG. 1 schematically represents the device for determining an estimation of the total mass of a vehicle according to the invention.

A device 10 for determining an estimation of the mass of an automotive vehicle comprises a module for processing the data 20, a computation module 30 for computing the estimation of the mass of the vehicle and of the slope of the road, an end-of-journey detection module 40, a final computation module 50 for finally computing an average value of the mass of the vehicle at the end of the journey, and a communication module 60 for communicating the average value of the mass of the vehicle.

The module for processing the data 20 receives, as input, data retrieved from a database 21 of parameters of the vehicle, which parameters are hosted in a computer (not represented) of the automotive vehicle. The vehicle parameters transmitted to the processing module comprise:

- the equivalent mass of the rolling elements $m_r$, expressed in kg. This mass is obtained on the basis of the characteristics of the corresponding components. Thus, the equivalent mass of the wheels is obtained on the basis of the characteristics of the wheels and tires and the equivalent mass of the inertias of the drivetrain (engine, gearbox, transmission shaft ...) is obtained on the basis of the characteristics of the heat engine (capacity and number of cylinders).
- the coefficient of rolling resistance of tires $c_r$. Since this coefficient is related to the tires, it evolves over time. In order to obtain the best possible accuracy in the estimation of the mass, provision could be made to estimate this coefficient by a specific estimation method.
- the coefficients of the aerodynamic resistance, such as the density of the air of the vehicle $\rho_a$, the frontal surface area of the vehicle $A_f$, the drag coefficient $c_x$.
- the radius of the wheels $r_w$.

The module for processing the data 20 also receives setting parameters from a settings database 22, such as the execution time of the algorithm for estimating the mass $\Delta T$, the covariance matrix of the measurement noise R, the covariance matrix Q of the modelling indeterminacies with regard to the speed and the slope and the covariance matrix $Q_M$ of the modelling indeterminacies with regard to the mass.

The data processing module 20 furthermore receives data originating from a communication network 23 well known to the person skilled in the art under the acronym "CAN: Controller Area Network". The data transmitted by the CAN network comprise the speed of the vehicle v, the downshift ratio of the gearbox, the level of depression of the brake pedal, the level of use of the retarder and an estimation of the torque provided by the heat engine and of these mechanical frictions.

The downshift ratio of the gearbox, the motor torque, the mechanical friction torque of the heat engine and the radius of the wheels are used to compute the known so-called "control" variable u.

Finally, the module for processing the data 20 can also receive in real time the position of the vehicle in the form of latitude, longitude and altitude as a function of the satellite data received by the global positioning system (not represented).

The module for processing the data 20 comprises an initialization module 24 for initializing, at the instant t=0, the mass of the vehicle $m_v$, the speed of the vehicle v, the slope of the road α, as well as two covariance matrices P, of dimension 2×2, expressing the covariance of the error in the speed variable and slope variable and $P_M$, of dimension 1×1, expressing the covariance of the error in the mass variable.

The module for processing the data 20 also comprises a verification module 25 for verifying, at the instant t=k, that all the conditions are fulfilled for undertaking the computation of the estimation of the mass. Stated otherwise, to undertake the computation of the estimation of the mass, the speed of the vehicle v must be strictly positive and the position of the brake pedal and the level of use of the retarder must be zero. As a variant, it would also be possible to envisage conditioning the computation of the estimation of the mass upon the engaging of a ratio of the gearbox.

If one of these conditions is not satisfied, the module for computing the estimation of the mass will undertake the computation of the mass and of the slope as a function of the data at the instant t=k−1.

The computation module 30 for computing the estimation of the mass of the vehicle and of the slope of the road uses an algorithm with a recursive approach based on a mathematical model of the longitudinal dynamics of the vehicle.

The equation of dynamics for the vehicle which links the loadings acting on the vehicle to the mass of the vehicle makes it possible to obtain equation Eq. 1:

$$(m_v + m_r) \cdot \frac{d}{dt}v(t) = F_t(t) - F_{ext}(t) \quad \text{(Eq. 1)}$$

With:

$m_v$, the mass of the vehicle, expressed in kg;
$m_r$, the equivalent mass of the rolling elements, expressed in kg;
v, the speed of the vehicle, expressed in m·s$^{-2}$;
$F_t(t)$, the traction force applied to the vehicle, expressed in N; and
$F_{ext}(t)$, the exterior forces applied to the vehicle, expressed in N.

The traction force $F_t(t)$ may be written according to the following equation:

$$F_t(v) = T_e(t) \cdot \gamma(t) \cdot \eta_{gb} \cdot r_w \quad \text{(Eq. 2)}$$

With:

$T_e$, the torque of the heat engine, expressed in N·m;
γ, the downshift coefficient of the transmission;
$\eta_{gb}$, the efficiency coefficient of the transmission; and
$r_w$, the radius of the wheel, expressed in m.

The set of exterior forces $F_{ext}(t)$ applied to the vehicle groups together the aerodynamic friction force Fa(t), the rolling resistance force $F_r(t)$ and the force induced by gravity $F_g(t)$.

The aerodynamic friction force Fa(t) depends on the density of the air of the vehicle $\rho_a$, on the frontal surface area of the vehicle $A_f$, on the drag coefficient $c_x$ and on the relative forward speed of the vehicle with respect to the air (v−$v_{wind}$). The aerodynamic friction force Fa(t) may be written according to the following equation:

$$F_a(v) = \tfrac{1}{2} \rho_a \cdot A_f \cdot c_x \cdot (v - v_{wind})^2 \quad \text{(Eq. 3)}$$

The speed relatively of the wind $v_{wind}$ is not known, in order to compute equation Eq. 3, the assumption is made that this speed is negligible, in so far as it does not have any impact on the accuracy of the estimation of the mass of the vehicle.

The rolling resistance force $F_r(t)$ depends on the mass of the vehicle $m_v$, on the coefficient of rolling resistance of the tires $c_r$, and on the slope of the road $\alpha$, as described in the following equation:

$$F_r(v) = c_r \cdot m_v \cdot \cos(\alpha) \quad \text{(Eq. 4)}$$

The force induced by gravity $F_g(t)$ depends on the mass of the vehicle $m_v$, on the gravity constant g and on the slope of the road $\alpha$, as described in the following equation:

$$F_g(\alpha) = m_v \cdot g \cdot \sin(\alpha) \quad \text{(Eq. 5)}$$

The computation module 30 comprises a first estimation module 31 for estimating the speed $v_{est}$ of the vehicle, the slope of the road $\alpha_{est}$ and the mass of the vehicle $m_{v,est}$. The first estimation module 31 comprises a first, so-called "Kalman", filter $F_1$ allowing the filtering of the measurement of the speed and of the estimation of the slope of the road travelled and a second, so-called "Kalman", filter $F_2$ making it possible to estimate the mass of the vehicle. The two filters are executed in parallel so that the information is pooled between the two filters and the variables estimated by the first filter are necessary for the estimation of the second filter, and vice versa.

The estimation of the speed $v_{est}$ of the vehicle is computed according to the following equation:

$$v_{est}(k) = v(k-1) + \frac{\Delta T}{M(k-1)+m_r} \cdot \left( u(k-1) - c_r \cdot m_v(k-1) - g \cdot m_v(k-1)\sin(\alpha(k-1)) - \frac{1}{2} \cdot \rho_a \cdot A_f \cdot c_x \cdot v^2(k-1) \right) \quad \text{(Eq. 6)}$$

The estimation of the slope of the road $\alpha_{est}$ is computed according to the following equation:

$$\sin(\alpha_{est}(k)) = \sin(\alpha(k-1)) \quad \text{(Eq. 7)}$$

The estimation of the mass of the vehicle $m_{v,est}$ is computed according to the following equation:

$$m_{v,est}(k) = m_v(k-1) \quad \text{(Eq. 8)}$$

The first estimation module 31 determines equations 6 to 8 as a function of equations 1 to 5, of the measured variables and of the values of the mass of the vehicle, of the speed of the vehicle and of the slope of the road which were computed at the instant $t=k-1$.

The computation module 30 also comprises a second estimation module 32 for estimating the two covariance matrices $P_{est}$ and $P_{M,is}$ on the basis of the values at the instant $t=k-1$, of equations 1 to 5 and of a so-called Riccati equation whose sought-after variable is the covariance matrix of the estimation errors:

$$P_{est}(k) = A(k) \cdot P(k-1) \cdot A(k)^T + Q \quad \text{(Eq. 9)}$$

$$P_{M,est}(k) = P_M(k-1) + Q_M \quad \text{(Eq. 10)}$$

With:
A, the tangent linearized dynamic matrix (linearization of equations Eq. 6 Eq. 7 with respect to the speed and the slope)
Q, the covariance matrix of the modelling indeterminacies with regard to the speed and the slope and the matrix; and
$Q_M$, the covariance matrix of the modelling indeterminacies with regard to the mass.

The computation module 30 furthermore comprises a correction module 33 for correcting the estimation values computed in equations 6 to 8 comprising a module 34 for computing the estimation error $\varepsilon(k)$ comparing the value of the estimation of the speed $v_{est}$ computed by the first estimation module with the value of the speed $v_{CAN}$ measured by the CAN network:

$$\varepsilon(k) = v_{est}(k) - v_{CAN}(k) \quad \text{(Eq. 11)}$$

The correction module 33 comprises a module 35 for computing the proportionality coefficients L and $L_M$, termed "gain of the observer", computed on the basis of the covariance matrices $P_{est}$ and $P_{M,is}$ and of the equations of dynamics 1 to 5:

$$L(k) = (L_1(k), L_2(k))^T = P_{est}(k) \cdot C^T(k) \cdot (C(k) \cdot P_{est}(k) \cdot C^T(k) + R)^{-1} \quad \text{(Eq. 12)}$$

$$L_M(k) = P_{M,est}(k) \cdot C_M^T(k) \cdot (C_M(k) \cdot P_{M,est}(k) \cdot C_M^T(k) + R)^{-1} \quad \text{(Eq. 13)}$$

With:
$L_1$, $L_2$, defined by equation Eq. 12; and
C, $C_M$, the tangent linearized output matrices (linearization of the output equations of the system with respect to the state→C=(0,1) $C_M$=Cdf/d$_M$, where f=Eq. 6 and Eq. 7)

With:

$$P(k) = P_{est}(k) - L(k) \cdot C(k) \cdot P_{est}(k) \quad \text{(Eq. 14)}$$

$$P_M(k) = P_{M,est}(k) - L_M(k) \cdot C_M(k) \cdot P_{M,est}(k) \quad \text{(Eq. 15)}$$

The corrected value of the speed v of the vehicle is computed according to the following equation:

$$v(k) = v_{est}(k) + L_1(k) \cdot \varepsilon(k) \quad \text{(Eq. 16)}$$

The corrected value of the slope of the road $\alpha$ is computed according to the following equation:

$$\sin(\alpha(k)) = \sin(\alpha_{est}(k)) + L_2(k) \cdot \varepsilon(k) \quad \text{(Eq. 17)}$$

The corrected value of the mass of the vehicle my is computed according to the following equation:

$$m_v(k) = m_{v,est}(k) + L_M(k) \cdot \varepsilon(k) \quad \text{(Eq. 18)}$$

The end-of-journey detection module 40 verifies whether the journey has terminated, for example, with the aid of a means of timeout and of comparing the timeout with a threshold value. If the journey has not terminated, the computation module 30 repeats equations 6 to 18.

When the journey has terminated, the final computation module 50 computes an average value of the mass Avg($m_v$) of the vehicle at the end of the journey. The communication module 60 thereafter transmits the average value of the mass Avg($m_v$) of the vehicle to a server (not represented), for example outside the vehicle, for example by telematic means.

Figure 2:
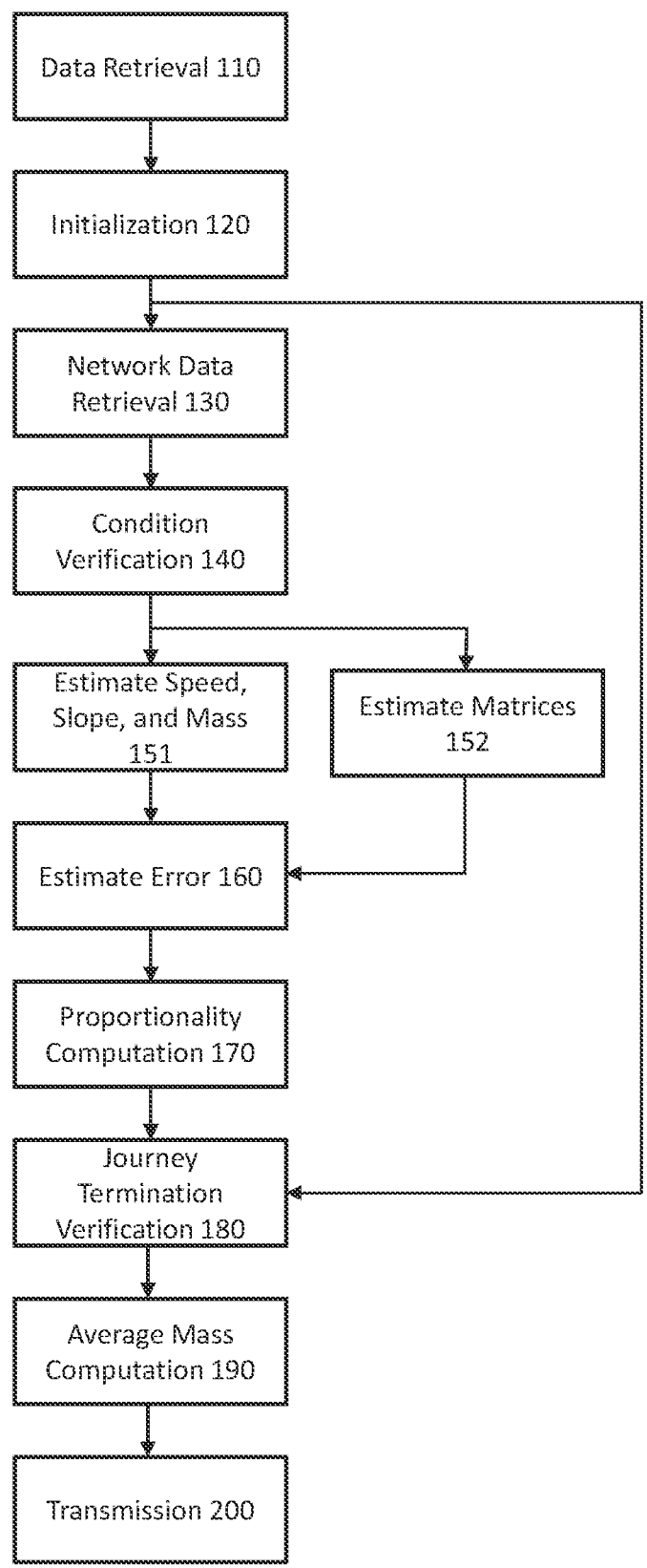
FIG. 2 illustrates the steps of the method for determining an estimation of the total mass of a vehicle according to the invention.

The flowchart represented in FIG. 2 illustrates the method 100 for determining an estimation of the mass of an automotive vehicle.

During a first step 110, the following data are retrieved: the equivalent mass of the rolling elements $m_r$; the coefficient of rolling resistance of the tires $c_r$, the coefficients of the aerodynamic resistance, such as the density of the air of the vehicle $\rho_a$, of the frontal surface area of the vehicle $A_f$, of the drag coefficient $c_x$; the radius of the wheels $r_w$; and the setting parameters such as the execution time of the algorithm for estimating the mass $\Delta T$, the covariance matrix of the measurement noise R, the covariance matrix Q of the modelling indeterminacies with regard to the speed and the slope and the covariance matrix $Q_M$ of the modelling indeterminacies with regard to the mass.

By way of nonlimiting example, it is possible to also retrieve, in real time, the position of the vehicle in the form of latitude, longitude and altitude as a function of the satellite data received by the GPS global positioning system (not represented).

During a second step 120, at the instant t=0, the mass of the vehicle $m_v$, the speed of the vehicle v, the slope of the road ($\alpha$), as well as two covariance matrices P, of dimension 2×2, expressing the covariance of the error in the speed variable and slope variable and $P_M$, of dimension 1×1, expressing the covariance of the error in the mass variable are initialized.

During a third step 130, data originating from the "CAN" communication network are retrieved, such as the speed of the vehicle v, the downshift ratio of the gearbox, the level of depression of the brake pedal, the level of use of the retarder and an estimation of the torque provided by the heat engine and of these mechanical frictions.

During a fourth step 140, it is verified, at the instant t=k, that all the conditions are fulfilled for undertaking the computation of the estimation of the mass. Stated otherwise, to undertake the computation of the estimation of the mass, the speed of the vehicle v must be strictly positive and the position of the brake pedal and the level of use of the retarder must be zero. As a variant, it would also be possible to envisage conditioning the computation of the estimation of the mass upon the engaging of a ratio of the gearbox.

If one of these conditions is not satisfied, the module for computing the estimation of the mass will undertake the computation of the mass and of the slope as a function of the data at the instant t=k−1. Stated otherwise, the values are pegged at the previous instant k−1.

During a fifth step 151, the estimation of the speed $v_{est}$ of the vehicle, of the slope of the road $\alpha_{est}$ and of the mass of the vehicle $m_v$ is computed by using an algorithm with a recursive approach based on a mathematical model of the longitudinal dynamics of the vehicle resulting from equations 1 to 5 hereinabove.

At the same time, during a step 152, the estimation of the two matrices $P_{est}$ and $P_{M,is}$ is computed according to equations 9 and 10:

$$P_{est}(k)=A(k)\cdot P(k-1)\cdot A(k)^T+Q \quad \text{(Eq. 9)}$$

$$P_{M,est}(k)=P_M(k-1)+Q_M \quad \text{(Eq. 10)}$$

During a sixth step 160, the value of the estimation error $\varepsilon(k)$ is computed by comparing the value of the estimation of the speed $v_{est}$ computed by the first estimation module with the value of the speed $v_{CAN}$ measured by the CAN network:

$$\varepsilon(k)=v_{est}(k)-v_{CAN}(k) \quad \text{(Eq. 11)}$$

During a seventh step 170, a proportionality coefficient L, termed "gain of the observer", is computed according to the above equations 12 to 15. The proportionality coefficient L computed on the basis of the covariance matrices $P_{est}$ and $P_{M,is}$ and of the equations of dynamics 1 to 5 and the value of the vehicle speed $v_{est}$ computed according to equation 6, the value of the slope of the road $\alpha_{est}$ computed according to equation 7 and the value of the vehicle mass of the vehicle $m_{v,est}$ computed according to equation 8 are corrected.

During an eighth step 180, it is verified whether the journey has terminated, for example, with the aid of a means of timeout and of comparing the timeout with a threshold value. If the journey has not terminated, steps 130 to 170 are repeated.

When the journey has terminated, an average value of the mass $Avg(m_v)$ of the vehicle at the end of the journey is computed, in step 190, and the average value of the mass $Avg(m_v)$ computed is transmitted, in step 200, to a server (not represented), for example outside the vehicle, for example by telematic means.

Thus, the total mass of a vehicle can be estimated in a reliable and fast manner, doing so even under condition of slope of the road travelled.

The vehicle can be an automotive vehicle or a train coach or a trolley or a lifting apparatus.

By mass, by "total mass" of an automotive vehicle, is meant the mass of the vehicle, including its cargo in the case of a semi-trailer or of articulated vehicles and/or, including its passengers in the case of a cargoless vehicle or of a bus.

The invention claimed is:

1. A device-implemented method for determining the total mass of an automotive vehicle in accordance with (i) data from a communication network and (ii) parameters of the vehicle, wherein, in the method, data is retrieved from a database of parameters of the vehicle, the parameters being hosted in a computer of the vehicle, the method comprising:
   retrieving, from a settings database, setting parameters including (a) execution time of a method for estimating the mass $\Delta T$, (b) a covariance matrix R of measurement noise, (c) a covariance matrix Q of modelling indeterminacies with regard to speed and slope, and (d) a covariance matrix $Q_M$ of modelling indeterminacies with regard to the mass;
   retrieving data originating from the communication network, the data including (a) a speed of the vehicle v, (b) a downshift ratio of a transmission $\gamma$, (c) a level of depression of a brake pedal, (d) a level of use of a retarder, and (e) an estimation of a torque provided by a heat engine $T_e$ and of mechanical friction;
   determining a motive force $F_t(t)$ generated by the vehicle in accordance with (a) a motor torque value $T_e$, (b) the downshift ratio of the transmission $\gamma$, (c) an efficiency coefficient of the transmission $\eta_{gb}$, and (d) a radius of a wheel $r_w$;
   determining an aerodynamic friction force $F_a(t)$ in accordance with the data retrieved from the database of parameters;
   determining a rolling resistance force $F_r(t)$ in accordance with (a) a mass of the vehicle $m_v$, (b) a coefficient of rolling resistance of tires $c_r$, and (c) a slope of a road $\alpha$;
   determining a force induced by gravity $F_g(t)$ in accordance with (a) the mass of the vehicle $m_v$, (b) a gravity constant g, and (c) the slope of the road $\alpha$;
   determining an estimation of, at an instant k, (a) a total laden mass $m_{v,est}$ of the vehicle, (b) a speed of the vehicle $v_{est}$, and (c) a slope of the road $\alpha_{est}$ by applying an equation of dynamics in accordance with values, at a previous instant k−1, of (a) a total mass of the vehicle, a speed of the vehicle, and (c) a slope of the road; and
   verifying that a journey of the vehicle has terminated, and, when the journey of the vehicle has terminated, (1) computing an average value of the mass $Avg(m_v)$ of the vehicle at an end of the journey, in accordance with the estimation of the mass of the vehicle $m_{v,est}$ and (2) telematically communicating the computed average value of the mass $Avg(m_v)$ to an external server,
   wherein in the determining of the estimation of (a) the total laden mass my est of the vehicle, (b) the speed of the vehicle $v_{est}$, and (c) the slope of the road $\alpha_{est}$, a first Kalman filter $F_1$ is applied for filtering of measurement of speed of the vehicle and of the estimation of slope of the road, and a second Kalman filter $F_2$ is applied for estimating the mass of the vehicle, said first filter and said second filter being executed in parallel so that (a)

information is pooled between the first filter and the second filter and (b) variables estimated by the first filter are necessary for the estimation of the second filter, and vice versa, and wherein at the same time as the determining of the estimation of (a) the total laden mass my est of the vehicle, (b) the speed of the vehicle $v_{est}$, and (c) the slope of the road $\alpha_{est}$, an estimation is determined of two covariance matrices including (1) a first covariance matrix P, of dimension 2×2, expressing covariance of an error in speed and slope and (2) a second covariance matrix $P_M$, of dimension 1×1, expressing covariance of an error in mass, in accordance with (i) the covariance matrix Q of modelling indeterminacies with regard to speed and slope and (ii) the covariance matrix $Q_M$ of modelling indeterminacies with regard to mass, and wherein the two covariance matrices P and $P_M$ are determined in accordance with (a) an equation of dynamics, (b) values at a previous instant k−1 of (i) a total mass of the vehicle, (ii) a speed of the vehicle, and (iii) a slope of the road, and (c) a Riccati equation whose sought-after variable is a covariance matrix of estimation errors.

2. The device-implemented method according to claim 1, further comprising the step of, prior to the retrieving of the data originating from the communication network, initializing at an initial instant (a) the mass of the vehicle $m_v$, (b) the speed of the vehicle v, (c) the slope of the road $\alpha$, and (d) the two covariance matrices P and $P_M$.

3. The device-implemented method according to claim 1, further comprising the step of, prior to the determining of the estimation, verifying at the instant k that conditions have been fulfilled for undertaking a computation of the estimation of the mass.

4. The device-implemented method of determination according to claim 3, wherein the conditions are (a) that the speed of the vehicle v is positive and (b) that both the position of the brake pedal and the level of use of the retarder are zero.

5. The device-implemented method of determination according to claim 1, wherein a value of an estimation error ε(k) is computed by comparing the value of the estimation of the speed $v_{est}$ with the value of the speed obtained from the communication network.

6. The device-implemented method of determination according to claim 1, wherein at least one proportionality coefficient is computed in accordance with (a) the covariance matrices P and $P_M$ and of (b) the equation of dynamics.

7. The device-implemented method of determination according to claim 6, wherein the estimation of (a) the speed of the vehicle $v_{est}$, (b) the slope of the road $\alpha_{est}$, and (c) the mass of the vehicle $m_{v,est}$ is corrected in accordance with (a) a value of an estimation error ε(k) and (b) the at least one proportionality coefficient, wherein a value of the estimation error ε(k) is computed by comparing the value of the estimation of the speed $v_{est}$ with the value of the speed obtained from the communication network.

8. A device for determining a total mass of an automotive vehicle in accordance with (a) data from a communication network and (b) parameters of the vehicle, wherein the device is configured to receive, as input, (1) data from a database of parameters of the vehicle, the parameters being hosted in a computer of the vehicle and comprising (a) a mass of rolling elements $m_r$, (b) a coefficient of rolling resistance of tires $c_r$, (c) a density of air of the vehicle $\rho_a$, (d) a frontal surface area of the vehicle $A_f$, (e) a drag coefficient $c_x$, and (f) a radius of a wheel $r_w$ of the vehicle, (2) setting parameters from a settings database, the setting parameters comprising (a) an execution time of a method for estimating the mass ΔT, (b) a covariance matrix R of measurement noise, (c) a covariance matrix Q of modelling indeterminacies with regard to speed and slope, and (d) a covariance matrix $Q_M$ of modelling indeterminacies with regard to the mass, and (3) data originating from a communication network, the data including (a) a speed of the vehicle v, (b) a downshift ratio of a transmission γ, (c) a level of depression of a brake pedal, (d) a level of use of a retarder, and (e) an estimation of a torque provided by a heat engine $T_e$ and of mechanical friction, wherein the device is further configured to determine (1) a motive force $F_t(t)$ generated by the vehicle, in accordance with (a) a motor torque value $T_e$, (b) the downshift ratio of the transmission γ, (c) an efficiency coefficient of the transmission $\eta_{gb}$, and (d) the radius of a wheel $r_w$ of the vehicle, (2) an aerodynamic friction force $F_a(t)$, in accordance with the data received from the database of parameters, a rolling resistance force $F_r(t)$, in accordance with (a) the mass of the vehicle $m_v$, (b) the coefficient of rolling resistance of the tires $c_r$, and (c) a slope of a road α, and (4) a force induced by gravity $F_g(t)$, in accordance with (a) the mass of the vehicle $m_v$, (b) a gravity constant g, and (c) the slope of the road α, wherein the device is further configured to make an estimation of, at an instant k, (a) a total laden mass $m_{v,est}$ of the vehicle, (b) a speed of the vehicle $v_{est}$, and (c) a slope of the road $\alpha_{est}$ by applying an equation of dynamics in accordance with values, at a previous instant k−1, of (a) a total mass of the vehicle, (b) a speed of the vehicle, and (c) a slope of the road, wherein the device is further configured to (1) compute an average value of the mass Avg($m_v$) of the vehicle at an end of a journey in accordance with the estimation of the mass of the vehicle $m_{v,est}$ and (2) telematically communicate the computed average value of the mass Avg($m_v$) of the vehicle to an external server, wherein in the determining of the estimation of (a) the total laden mass my est of the vehicle, (b) the speed of the vehicle $v_{est}$, and (c) the slope of the road $\alpha_{est}$, a first Kalman filter $F_1$ is applied for filtering of measurement of speed of the vehicle and of the estimation of slope of the road, and a second Kalman filter $F_2$ is applied for estimating the mass of the vehicle, said first filter and said second filter being executed in parallel so that (a) information is pooled between the first filter and the second filter and (b) variables estimated by the first filter are necessary for the estimation of the second filter, and vice versa, and wherein at the same time as the determining of the estimation of (a) the total laden mass my est of the vehicle, (b) the speed of the vehicle $v_{est}$, and (c) the slope of the road $\alpha_{est}$, an estimation is determined of two covariance matrices including (1) a first covariance matrix P, of dimension 2×2, expressing covariance of an error in speed and slope and (2) a second covariance matrix $P_M$, of dimension 1×1, expressing covariance of an error in mass, in accordance with (i) the covariance matrix Q of modelling indeterminacies with regard to speed and slope and (ii) the covariance matrix $Q_M$ of modelling indeterminacies with regard to mass, and wherein the two covariance matrices P and $P_M$ are determined in accordance with (a) an equation of dynamics, (b) values at a previous instant k−1 of (i) a total mass of the vehicle, (ii) a speed of the vehicle, and (iii) a slope of the road, and (c) a Riccati equation whose sought-after variable is a covariance matrix of estimation errors.

9. The device according to claim 8, wherein the device is further configured to correct the estimation, the correction comprising (a) computing an estimation error ε(k) comparing the value of the estimation of the speed $v_{est}$ with the value of the speed obtained from the communication network and (b) computing a proportionality coefficient in accordance with the covariance matrices P and $P_M$ and the equation of dynamics.

* * * * *